ns

SELF-ADHESIVE ACRYLATE COPOLYMERS, A PROCESS FOR THEIR PREPARATION AND SELF-ADHESIVE WEBS, WHICH CONTAIN THEM

This is a divisional of copending application Ser. No. 07/884,738 filed on May 15, 1992.

BACKGROUND OF THE INVENTION

1. Field of the Invention

The invention concerns self-adhesive acrylate copolymers, a process for their preparation as well as an especially favourable use of these acrylate copolymers.

2. Background of the Related Art

Self-adhesive substances or also pressure-sensitive substances are permanently tacky substances, which adhere spontaneously to many surfaces of different materials on light pressure. Such pressure-sensitive substances are almost exclusively used for the coating of webs, such as paper or film, adhesive labels or self-adhesive decorative films. Important properties of the pressure-sensitive substances are for example their adhesion capacity, their heat, ageing and softener stability.

From U.S. Pat. No. 3,691,140, adhesive elastomer acrylate copolymers are known in the form of micro-spheres. These micro-spheres are produced by aqueous suspension polymerization. The micro-spheres which are obtained after polymerisation are dispersed in solvents, whereby suspensions are obtained. After the application of such a suspension on a web to be coated, the solvent is evaporated, so that a coating of these acrylate copolymer micro-spheres results on the web. This coating has an adhesive effect, so that the web thus coated can be used, for example, for covering or protection of sensitive surfaces. Furthermore, these coated webs have the desirable property that they can be used repeatedly and can repeatedly be removed from a surface to be protected, without this deteriorating effect on the adhesion or adhesive properties. However, this known type of copolymer suffers from the disadvantage that its adhesive properties gradually decrease with time, so that finally no adhesion can be achieved. This is because of a migration of the micro-spheres from the web on which they are applied, to the surface which is covered by the self-adhesive web.

For this reason, this type of adhesive substance was further developed in accordance with U.S. Pat. No. 3,67,731 (or the corresponding DE patent 24 17 312) so that in addition to the micro-spheres of acrylate copolymer, a binding agent layer is provided on a web which is to be coated. This binding agent layer, which contains micro-spheres, is applied so that one part of the micro-spheres protrudes from the binding agent layer and thus can come into contact with a corresponding material onto which it should adhere.

It is an object of the the present invention to provide an acrylate copolymer which has good and long-lasting adhesive properties. In particular, their properties should not themselves alter disadvantageously when repeated adhesion and removal is undertaken from materials to be secured. In addition, the invention also has as an object a process for the preparation of such acrylate copolymers by simple means and methods.

DETAILED DESCRIPTION OF THE INVENTION

According to the invention this problem is solved by providing an acrylate copolymer which can be produced by the combined suspension and emulsion polymerisation of acryl monomers optionally with the addition of copolymerizable monomers. Surprisingly it has been found that acrylate copolymers produced in this way have the desired properties, that on the one hand the self-adhesive effect (contact adhesion) is present and on the other, such an effect is long-lasting and is not lost when products coated therewith are repeatedly subjected to adhesion and removal.

The acrylate copolymers are preferably suitable for the production of self-adhesive webs, which consist of a substrate, such as for example, a paper or a film. For this purpose, the acrylate copolymer is applied on a web to be coated, whereby a coating is formed of this self-adhesive acrylate copolymer. Moreover, after multiple use of this web thus coated, no migration of the acrylate copolymer takes place to the surface of the material with which adhesion is to be achieved.

The acrylate copolymer which can be produced by the combined suspension and emulsion polymerisation is preferably present in the form of a mixture of relatively coarse particles and relatively fine particles. The coarse particles preferably have an average particle size of 5–50 $\mu$m, and the fine particles have a particle size of less than 0.5 $\mu$m, preferably less than 0.2 $\mu$m. The amount in terms of percent by weight of the copolymer in the form of the coarse particles should exceed that of the fine particles. A ratio of 1 to 0.1–0.6 of the coarse to the fine particles is preferred. Thereby good adhesion of the copolymer, on the one hand, with a web which is coated with this polymer, and on the other hand with another substrate, which is brought into contact with this coated web, can be achieved.

The acrylate copolymer is produced by a combination of suspension and emulsion polymerisation of acryl monomers, optionally with additional copolymerizable monomers. Preferably a pure suspension polymerization is initially carried out, followed by emulsion polymerization. However, the suspension polymerization can continue, while the emulsion polymerization is commenced as an accompanying polymerization. In this case, the two types of polymerization proceed concomitantly.

In the case of suspension polymerization, the initial monomers are finely distributed in water by using suitable emulsifiers. To start the polymerization, oil-soluble initiators are used which are difficult to dissolve in water. The initiators are dissolved in the monomer droplets which are also scarcely soluble in water. As initiators, in particular organic peroxides, for example dilauroyl peroxide or dibenzoyl peroxide are suitable. The polymerization proceeds in accordance with a radical mechanism. Depending on the selection of the emulsifiers which are used, the stirring speed or the temperature, this process results in smaller or larger polymer micro-spheres dispersed in water.

As monomers, those including an acryl moiety, for example acrylic acid and methacrylic acid, as well as their derivatives or mixtures thereof, are suitable. Esters, amides, acrylic acid nitrile and their mixtures are considered preferably as derivatives. A preferred mixture comprises acrylic acid as well as at least one (meth)acrylic acid ester component, the alcohol of which has at least 4 C atoms. It is especially advantageous when the alcohol component of the ester has 4–12 C atoms. As examples, n- and iso-butyl acrylate, iso-octyl acrylate, 2-ethyl-hexyl acrylate, lauryl acrylate are named. As further monomer esters for the modification of the adhesive properties, for example adhesive hardness or softness, cross-linking, adhesive polarity, tert.-butyl acrylate, hydroxy ethylacrylate, methylmethacrylate, hydroxy propyl methacrylate, ethylene glycol bimethacrylate or glycidyl methacrylate can also be added in small quantities.

These monomers can be mixed with each other so that the desired copolymers are produced by the polymerization. But it is also possible to use other suitable monomers as well. Particularly suitable as additional copolymerizable monomers, for example, are vinyl esters, vinyl ethers, maleic acid derivates, fumaric acid derivates and itaconic acid derivates. Of these, vinyl acetate, vinyl proprionate, vinylalkyl ether, vinylhydroxybutyl ether, maleic acid anhydride as well as semi- and di-esters of maleic acid are especially preferred. The amount of the additional copolymerizable monomer used is preferably more than 35% by weight of the total monomers.

The monomers which are used as the initial material are placed together with a suitable initiator in a reaction system, which contains primarily water and suitable emulsifiers. In a nitrogen atmosphere the suspension polymerization is then started at increased temperature, preferably approximately 50° C., the temperature during the reaction being in the range from about 50 to 85° C. This suspension polymerization is carried out for a period of 1 to 2 hours, preferably approximately 1.5 hours.

Subsequently the emulsion polymerization is commenced in this reaction system, by adding a water-soluble initiator to the reaction mixture which is not soluble in the monomer droplets which are difficult to dissolve in water. Preferably, for this purpose inorganic peroxide compounds are used, e.g. ammonium or potassium persulfate.

At the beginning of the emulsion polymerization, preferably the same monomers are again added to the reaction mixture, which were already used for the suspension polymerization carried out in the first step. The addition of monomers and initiators is performed preferably over a longer period, advantageously for example within about 4 hours. The emulsion polymerization is carried out at the same temperature as the suspension polymerization. The duration of emulsion polymerization is from 15 to 20 hours, preferably about 16 hours.

At the end of this reaction, a product is obtained which is in the form of a dispersion. The solid contents can preferably be in the range from 30–70, preferably 45–65% by weight. This dispersion can be further employed as such. However, there is also the possibility of precipitating the acrylate copolymer by the addition of methanol, for example, and then dispersing it in toluene or heptane. There is also the possibility of mixing the dispersion with solvents and thus preparing an emulsion.

The acrylate copolymer thus obtained is applied in the form of dispersions on a web to be coated. This structure comprises a substrate, which is coated on at least one side with the acrylate copolymer. After the drying of the adhesive, the layer of acrylate copolymer is present in the selected pattern, for example in dots or strips or as a full-surface film on the web. The dry weight amounts to about 3 20 g/m$^2$ for low tack adhesive specifications, but to attain higher adhesion substantially higher application weights may be used, for example in the range from 20–100 g/m$^2$.

By using the combined suspension and emulsion polymerization process it is possible to obtain acrylate copolymers which are present both in the form of relatively coarse particles having an average particle size in the range from 5 to 50 μm as well as in the form of fine to very fine particles having an average particle size in the range of less than 0.5 μm, especially less than 0.2 μm. This distribution, however, can be adjusted deliberately by modifying the reaction conditions.

The adhesive properties of the acrylate copolymer obtained can be influenced depending on the selection of the monomers and the cross-linking which is achieved. Thus it is possible to obtain high tack adhesive or low tack adhesive polymers. Low tack adhesive properties can also be achieved by having a higher share of coarser particles, which after application on a web constitute a structured adhesive surface. Such a structured adhesive surface provides the possibility of producing removable self-adhesive films or papers as sheets or webs, which can be used for example for a temporary protection of sensitive metal, plastic or glass surfaces.

By the use of the combined suspension and emulsion polymerization process in accordance with the invention, acrylate copolymers are provided which can be applied directly without the requirement for an additional binding agent layer on the web. In addition, the acrylate copolymers have an excellent adhesive property, which does not detriorate even after repeated use of the same coated web.

The process in accordance with the invention will be explained in more detail below with reference to the examples. Respectively one example is disclosed for the production of a high tack adhesive and a lo tack adhesive acrylate copolymer.

EXAMPLE 1: preparation of a strongly adhesive acrylate copolymer

A monomer mixture having the following composition is prepared:

| | |
|---|---|
| acrylic acid | 400 g |
| 2-ethyl-hexyl acrylate | 9600 g |
| dodecyl marcaptane | 2 g |
| dilauroyl peroxide | 16.5 g |

A reaction flask is flooded repeatedly with nitrogen in order to remove the air completely from this system. In a nitrogen atmosphere, in this reaction flask which is additionally equipped with a thermometer and a drip funnel, the following mixture is placed:

| | |
|---|---|
| water | 2000 g |
| sodium pyrophosphate | 5.6 g |
| reaction product of 1 mole octylphenol polyglycol ether (e.g. Antarox CA 890 from GAF) and 1 mole maleic acid anhydride sodium-sulfosuccinic acid-di-2-ethyl-hexyl-ester (e.g. Disponil SUS IC8 from Henkel) | 74 g |
| sodium-vinyl benzene sulfonate | 3 g |

1000 g of the above-named monomer mixture are added in a nitrogen atmosphere to this mixture by means of the drip funnel. The reaction mixture thus obtained is then heated, the polymerization starting at about 50° C. The temperature then rises to approximately 70° C. After about 1½ hours of reaction time, the mixture described below is added within 4 hours, also in a nitrogen atmosphere:

| monomer mixture (as above) | 9000 g |
|---|---|
| water | 3330 g |
| sodium-pyrophosphate | 33.3 g |
| reaction product of 1 mole octyl-phenolpolyglycol ether and 1 mole maleic acid anhydride | 300 g |
| sodium-sulfosuccinic acid di-2-ethylhexyl ester | 80 g |
| sodium-vinyl benzene sulfonate | 22.2 g |
| potassium-persulfate | 2.6 g |

During the addition of this mixture, the temperature is kept at approximately 70° C. The emulsion polymerization is carried out for a period of 16 hours at this temperature. A dispersion is obtained having a solid content of 65%.

EXAMPLE 2: preparation of a lock tack adhesive acrylate polymer

The following monomer mixture was prepared:

| glycidyl methacrylate | 5 g |
|---|---|
| ethylene glycoldimethacrylate | 10 g |
| acrylic acid | 10 g |
| hydroxy propylmethacrylate | 100 g |
| tert. butylacrylate | 1000 g |
| 2-ethyl-hexylacrylate | 8875 g |
| dilauroyl peroxide | 33.3 g |

The following mixture is placed in a reaction flask in accordance with the conditions as in example 1:

| water | 2000 g |
|---|---|
| sodium pyrophosphate | 5.6 g |
| reaction product of 1 mole octyl-phenolpolyglycol ether and 1 mole maleic acid anhydride | 11.8 g |
| sodium-sulfosuccinic acid di-2-ethyl hexyl ester | 37.1 g |
| sodium-vinyl benzene sulfonate | 3.6 g |

Under the same conditions as in example 1, 1000 g of the monomer mixture prepared above are added to this reaction mixture. Suspension polymerization is carried out under the same conditions and for the same period as in example 1. Subsequently to carry out the emulsion polymerization, the following mixture is added in a nitrogen atmosphere:

| monomer mixture (as above) | 9000 g |
|---|---|
| water | 3330 g |
| sodium-pyrophosphate | 33.3 g |
| reaction product of 1 mole octyl-phenyl polyglycol ether and 1 mole maleic acid anhydride | 300 g |
| sodium-sulfosuccinic acid-di-2-ethyl-hexyl ester | 80 g |
| sodium-vinyl benzene sulfonate | 22.2 g |

| -continued | |
|---|---|
| potassium persulfate | 1.3 g |

In this case as well, the emulsion polymerization is carried out under the same reaction conditions as in example 1. A dispersion is obtained having a solid content of 65%.

The dispersions thus obtained are applied directly on paper or films as the web to be coated. After drying, the dry weight of, for example, 5–10 g/m² results. When using the polymer as in example 1, the result is a very good and strong adhesive effect, whereas when using the polymer in accordance with example 2, a low tack adhesive effect is obtained.

The substrates which are coated with the polymers according to example 2 maintain their good adhesive capacity even after repeated removal from another surface onto which it has been applied.

We claim:

1. A method of preparing a self-adhesive web, which comprises:
    adhering to a web a self-adhesive acrylate copolymer obtained by subjecting acryl monomers to a combined suspension polymerization and emulsion polymerization.

2. A method as recited in claim 1, wherein said self-adhesive acrylate copolymer is prepared by the process wherein at least one additional copolymerizable monomer is added to said combined suspension polymerization and emulsion polymerization.

3. A method as recited in claim 1, wherein said method is used to prepare permanently tacky, detachable papers and films.

4. A method as recited in claim 2, wherein said method is used to prepare permanently tacky, detachable papers and films.

5. A self-adhesive web, comprising:
    a substrate which is provided on at least one side with a self-adhesive acrylate copolymer obtained by subjecting acryl monomers to a combined suspension polymerization and emulsion polymerization.

6. A self-adhesive web as recited in claim 5, wherein said self-adhesive acrylate copolymer is obtained by a process in which at least one additional copolymerizable monomer is subjected to said combined polymerization.

7. A self-adhesive web as recited in claim 5, wherein said web is made from paper.

8. A self-adhesive web in accordance with claim 5, wherein said web is made from a film.

9. A web as recited in claim 5, wherein the acrylate copolymer is provided on said web in any selected pattern.

10. A web as recited in claim 5, wherein said wherein said pattern is in a dot or strip form.

11. A web as recited in claim 5, wherein said web has low tack adhesive properties and said acrylate copolymer is applied in an amount of from 3 to 20 g/m² dry weight on said substrate.

12. A web as recited in claim 5, wherein said web has high tack adhesive properties and said acrylate copolymer is applied in an amount of from 20–11 g/m² dry weight on said substrate.

* * * * *